United States Patent
Sears (10) Patent No.: US 9,261,258 B2
(45) Date of Patent: Feb. 16, 2016

(54) HIGH BRIGHTNESS LIGHT EMITTING DIODE LUMINAIRE

(75) Inventor: Storm S. Sears, Dayton, NV (US)

(73) Assignee: Bruce Aerospace, Inc., Dayton, NV (US)

(*) Notice: Subject to any disclaimer, the term of this patent is extended or adjusted under 35 U.S.C. 154(b) by 6 days.

(21) Appl. No.: 13/366,520

(22) Filed: Feb. 6, 2012

(65) Prior Publication Data

US 2012/0188761 A1 Jul. 26, 2012

Related U.S. Application Data

(63) Continuation of application No. PCT/US2010/044452, filed on Aug. 4, 2010.

(60) Provisional application No. 61/231,096, filed on Aug. 4, 2009.

(51) Int. Cl.
| | |
|---|---|
| F21V 21/00 | (2006.01) |
| F21V 7/00 | (2006.01) |
| B60Q 3/02 | (2006.01) |
| F21S 4/00 | (2006.01) |
| B64C 27/82 | (2006.01) |
| B64D 11/00 | (2006.01) |
| F21W 101/06 | (2006.01) |
| F21W 101/08 | (2006.01) |
| F21Y 101/02 | (2006.01) |

(Continued)

(52) U.S. Cl.
CPC .............. *F21V 7/0008* (2013.01); *B60Q 3/025* (2013.01); *F21S 4/008* (2013.01); *F21V 7/005* (2013.01); *B64C 2027/8236* (2013.01); *B64D 11/00* (2013.01); *B64D 2011/0038* (2013.01); *F21W 2101/06* (2013.01); *F21W 2101/08* (2013.01); *F21Y 2101/02* (2013.01); *F21Y 2103/003* (2013.01); *F21Y 2113/005* (2013.01)

(58) Field of Classification Search
USPC .................................................. 362/231, 235
See application file for complete search history.

(56) References Cited

U.S. PATENT DOCUMENTS

| | | | |
|---|---|---|---|
| 6,541,800 | B2 | 4/2003 | Barnett et al. |
| 6,705,745 | B1 | 3/2004 | Pederson |

(Continued)

FOREIGN PATENT DOCUMENTS

| | | |
|---|---|---|
| EP | 2065632 | 6/2009 |
| EP | 2071227 | 6/2009 |

(Continued)

OTHER PUBLICATIONS

Supplemental European Search Report, dated Apr. 13, 2013.

(Continued)

*Primary Examiner* — Nimeshkumar Patel
*Assistant Examiner* — Brenitra M Lee
(74) *Attorney, Agent, or Firm* — Baker & Hostetler LLP (57) ABSTRACT

A light emitting diode (LED) luminaire that produces a uniform light pattern at close distances is provided. The LED luminaire includes a housing, a printed circuit board assembly thermally coupled to the housing, a plurality of high brightness (HB) LED emitters, thermally coupled to the printed circuit board assembly to form a linear array, and a linear reflector assembly, attached to the housing, to concentrate the light generated by the LED emitters over a beam angle formed by the upper surface of the housing and the linear reflector assembly.

17 Claims, 8 Drawing Sheets (51) Int. Cl.
  *F21Y 103/00* (2006.01)
  *F21Y 113/00* (2006.01)

(56) References Cited

U.S. PATENT DOCUMENTS

| | | |
|---|---|---|
| 6,882,111 B2 | 4/2005 | Kan et al. |
| 7,040,782 B2 | 5/2006 | Mayer |
| 7,182,480 B2 | 2/2007 | Kan |
| 7,387,405 B2 | 6/2008 | Ducharme et al. |
| 7,572,030 B2 | 8/2009 | Booth et al. |
| 2005/0180135 A1 | 8/2005 | Mayer et al. |
| 2006/0146531 A1 | 7/2006 | Reo et al. |
| 2007/0058377 A1 | 3/2007 | Zampini, II et al. |
| 2007/0206375 A1 | 9/2007 | Piepgras et al. |
| 2009/0161356 A1* | 6/2009 | Negley et al. ............ 362/231 |

FOREIGN PATENT DOCUMENTS

| | | |
|---|---|---|
| WO | 2005/098311 A2 | 10/2005 |
| WO | 2008/047335 A1 | 4/2008 |
| WO | 2008098360 | 8/2008 |
| WO | 2009084664 | 7/2009 |

OTHER PUBLICATIONS

Examination Report dated Jan. 8, 2014.

* cited by examiner

HIGH BRIGHTNESS LIGHT EMITTING DIODE LUMINAIRE

CROSS-REFERENCE TO RELATED APPLICATIONS

This application is a Continuation of International Patent Application No. PCT/US2010/044452, filed on Aug. 4, 2010, which claims priority to U.S. Provisional Patent Application 61/231,096, filed on Aug. 4, 2009, the disclosures of which are incorporated herein by reference in their entirety.

FIELD OF THE INVENTION

The present invention relates generally to a light emitting diode (LED) luminaire that produces a uniform light pattern at close distances. More specifically, the present invention relates to an LED luminaire that includes a linear array of High Brightness (HB) emitters.

BACKGROUND OF THE INVENTION

Conventional linear shaped LED luminaires used for lighting applications typically make use of a tightly spaced array of low to medium power LED emitters. The use of a tightly spaced LED array makes the luminaire capable of casting a uniform light pattern at short distances.

Due to the somewhat inefficient power conversion characteristics of LED emitters however, a tightly spaced LED array with a large number of LED emitters also results in increased power dissipation for the luminaire in relation to light output. Thus, as the number of LED emitters is increased, more of the available energy is dissipated in the form of heat as opposed to generating usable light output. In addition, the low to medium power LED emitters employed in tightly spaced LED arrays tend to have poor thermal transfer characteristics. These two factors combine to either limit the maximum power dissipation for the luminaire or to increase the size and weight of the heat sink surface required to prevent irreparable LED junction damage.

Conventional LED luminaires used for lighting applications typically make use of a diffused lens or some other form of secondary optics in order to blend the produced light pattern into a uniform presentation at close distances. Any such diffusion or optics however, results in a substantial reduction in light output due to transmission losses in the diffuser or optics material. As a result, the LED array must be driven at a higher level in order to offset these light losses, resulting in higher luminaire power consumption.

Another disadvantage of conventional LED luminaire designs relates to when they are employed in wall and/or ceiling applications where the luminaire is visible to the observer, such as, for example, within an aircraft. In such an application, the LED presentation must be heavily diffused otherwise the observer will be able to view the LED point sources in the luminaire directly. Direct viewing of the LED point sources is not only unsightly, but in addition, it is very unpleasant for the observer.

SUMMARY OF THE INVENTION

Embodiments of the present invention advantageously provide a light emitting diode (LED) luminaire that produces a uniform light pattern at close distances. More specifically, one embodiment provides an LED luminaire that includes a housing, a printed circuit board assembly thermally coupled to the housing, a plurality of high brightness (HB) LED emitters, thermally coupled to the printed circuit board assembly to form a linear array, and a linear reflector assembly, attached to the housing, to concentrate the light generated by the LED emitters over a beam angle formed by the upper surface of the housing and the linear reflector assembly.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout.

Embodiments of the present invention advantageously provide a widely spaced linear array of High Brightness (HB) emitters, used in conjunction with a linear reflector assembly, that prevents loss of LED luminaire output in unused directions while, at the same time, providing uniform light pattern blending at close distance for the spaced LED emitters.

In these embodiments, a widely spaced array of HB LED emitters is thermally bonded to a linear shaped luminaire by means of a thermal-clad or other high thermal efficiency PCB design. The HB emitters have a much higher thermal efficiency than low or medium power LED emitters which translates directly to higher power conversion efficiency and higher allowable operating temperatures. These factors in turn, translate to reduced heat sink surface area and weight for a given light output level.

The HB LED array is used in conjunction with a linear reflector assembly which maximizes LED light recovery and increases light projection in the direction of interest. The linear reflector also provides low loss blending of the light emissions from the individual LED point sources resulting in a completely uniform lighting presentation within one inch of the luminaire. The use of the reflector assembly makes possible various LED spacing intervals, such as, less than an inch (e.g., 0.5 inches) up to several inches (e.g., 3 inches) between emitters. Fewer LED emitters in the luminaire translates to greater power conversion efficiency, lower luminaire weight, increased reliability, and lower cost.

Embodiments of the present invention may be used with equal utility in sidewall and ceiling applications simply by adjusting the angular relationship between the LED emitter and reflector. In general, a narrow beam width presentation is more desirable for sidewall applications and wider beam width lighting pattern is more useful for ceiling applications.

Embodiments of the present invention also do not require the use of a diffusing lens or secondary optics to achieve uniform light blending from the LED point sources at short working distances. Thus, light level depreciation due to transmission losses through the diffuser or secondary optics system are not a factor and the power dissipation of the luminaire does not have to be increased to offset these effects.

Although used primarily for white lighting applications, in some embodiments of the present invention, other colors of LED emitters may be utilized to create colored lighting effects. In some embodiments, a second array of LED emitters with a different overall color, or color temperature, can be interspersed between the primary LED emitter array and can be used to generate different light output colors in different modes of luminaire operation.

The linear reflector additionally serves to shield the observer from direct observation of the LED emitters in the event that the luminaire is visible in the installation such as in sidewall applications. Out of necessity, the LED emitters must be placed as close as is practical to the conjunction of the linear reflector and the luminaire body to maximize LED light recovery. This serves to shield the LED emitters from direct observation.

Generally, the linear reflector concentrates all available light projection from the HB emitters, more than doubling the light output in the direction of interest and preventing wasted light and power, and blends light output from adjacent LED light sources such that a uniform light pattern is projected at distances of less than 1 inch, for example, from the luminaire housing. Accordingly, LED emitters spaced at intervals of 1.5 inches, for example, do not compromise the blending of the projected light pattern.

Sidewall Luminaire Embodiment

In the sidewall luminaire embodiment depicted in FIGS. 1-6, sidewall luminaire 100 employs a linear array of HB LED emitters 102 which are directly bonded to a thermally conductive printed circuit board assembly 104, which is mounted on a surface of housing 106. The LED emitters 102 may be arranged with a center-to-center spacing between about 0.5 inches and 3 inches, or, preferably, between 1 and 2 inches. In one embodiment, the center-to-center spacing is 1.5 inches. An LED driver assembly is disposed within the housing 106 and provides power to the LED emitters. The HB LED emitters 102 employed can be discriminated from low or medium power LED emitters because they have drive current capability in excess of 300 ma. Very low profile LED emitters may be used which advantageously have a Lambertian projection pattern. These LED emitters are placed as close as is practical to the conjunction of the luminaire housing 106 and the reflector 108 to maximize light recovery from the surface of the LED closest to the reflector. This arrangement more than doubles the projected light output in the forward direction.

The beam pattern projected from the light is dictated by the angular relationship between housing 106 and the reflector 108. In the sidewall embodiment, the beam angle of the projected light pattern is typically less than 90 degrees. The surface of the reflector 108 is angled to roughly parallel the surface of the sidewall panel 110. From the observers position, the LED emitters 102 will not be visible, only the projected light pattern. This relationship is illustrated, for example, in FIG. 6.

Figures 1, 2:
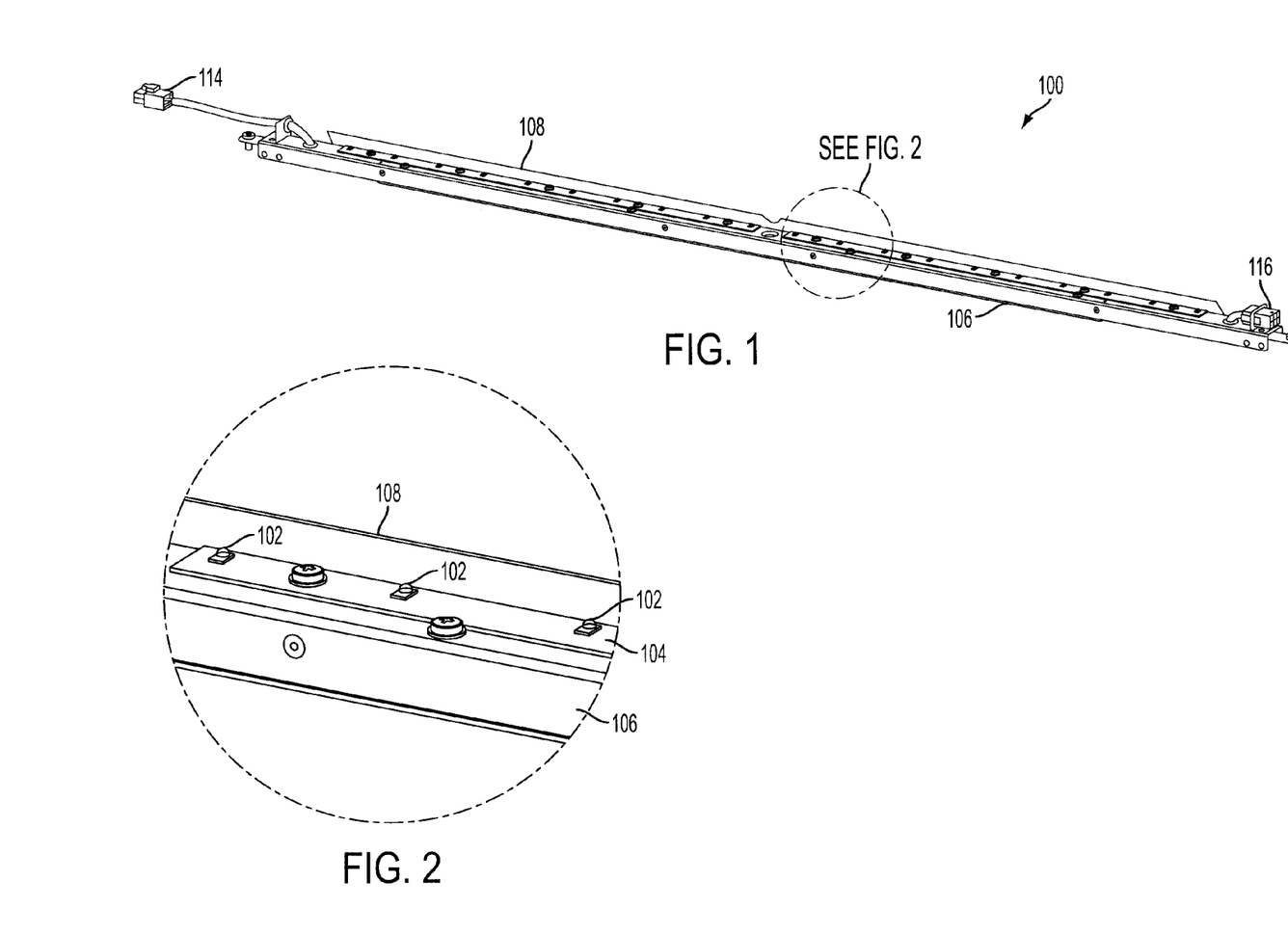
FIG. 1 depicts a perspective view of a sidewall luminaire, in accordance with an embodiment of the present invention.
FIG. 2 depicts a partial perspective view of the sidewall luminaire depicted in FIG. 1.
Figure 3:
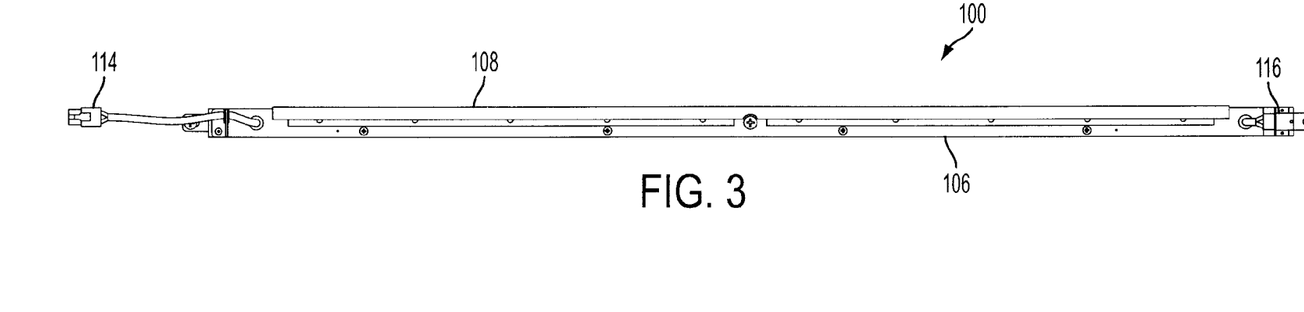
FIG. 3 depicts a top view of the sidewall luminaire depicted in FIG. 1.
Figure 4:
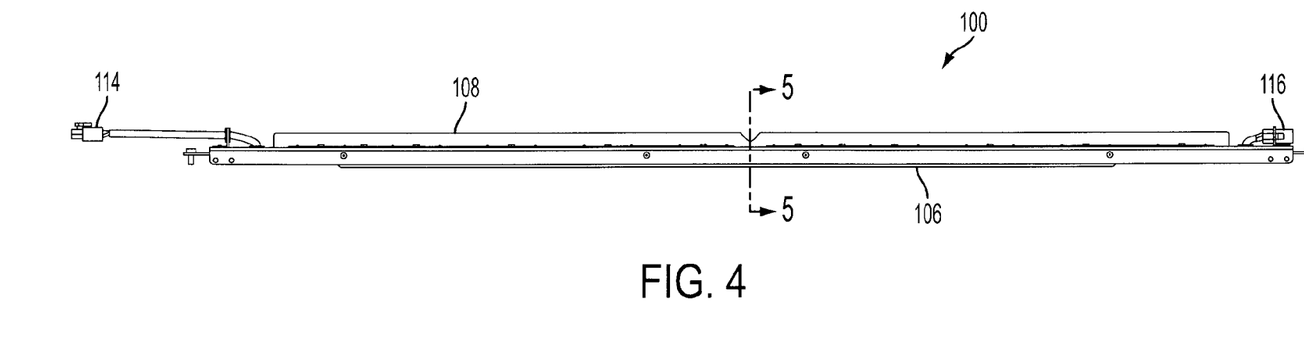
FIG. 4 depicts a front view of the sidewall luminaire depicted in FIG. 1.
Figure 5:
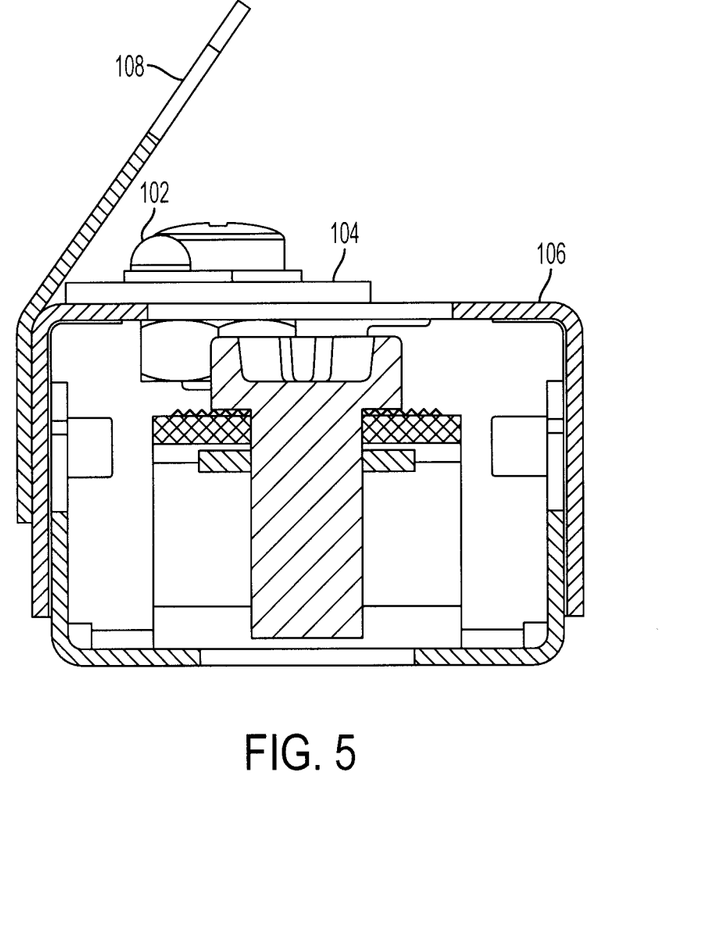
FIG. 5 depicts a sectional view of the sidewall luminaire depicted in FIG. 4.
Figure 6:
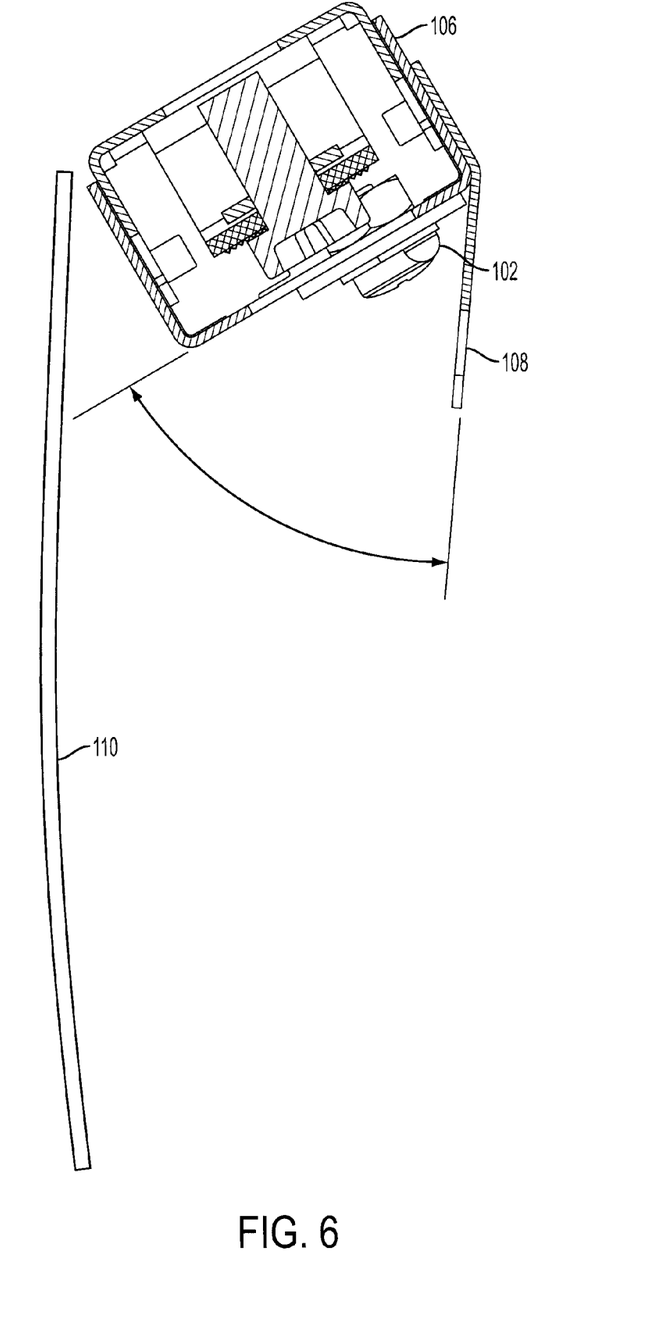
FIG. 6 depicts a sidewall installation geometry, in accordance with an embodiment of the present invention.
Figure 7:
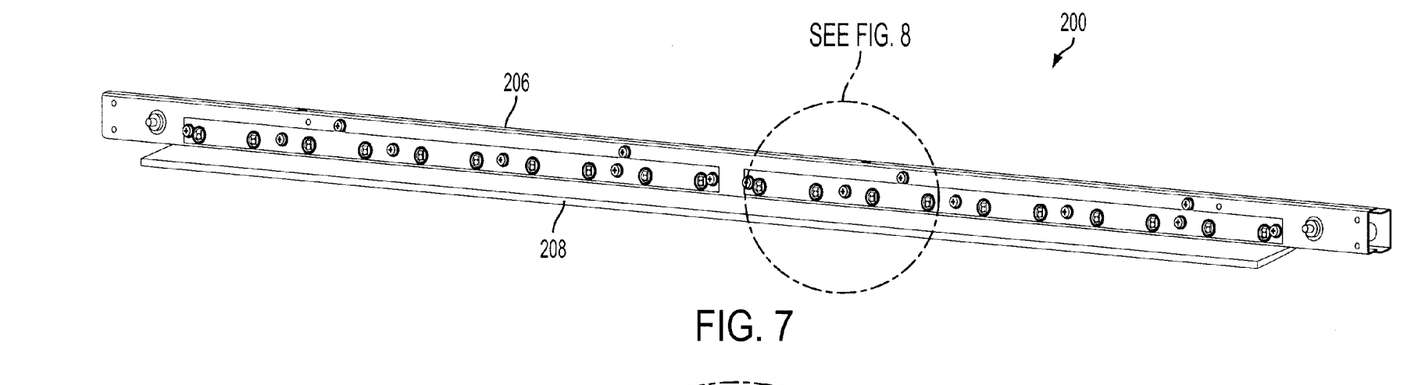
FIG. 7 depicts a perspective view of a ceiling luminaire, in accordance with another embodiment of the present invention.
Figure 8:
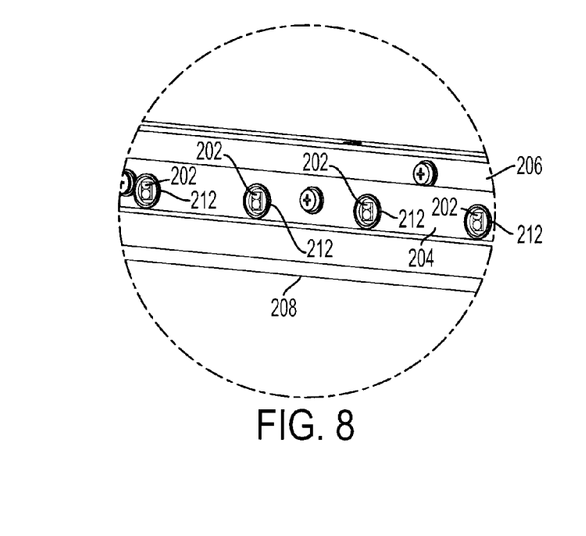
FIG. 8 depicts a partial perspective view of the ceiling luminaire depicted in FIG. 7.
Figure 9:
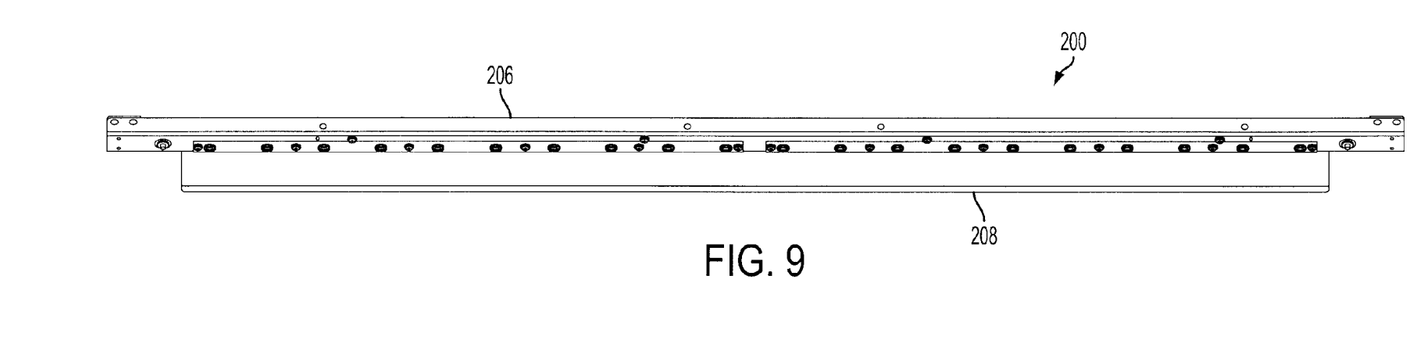
FIG. 9 depicts a top view of the ceiling luminaire depicted in FIG. 7.
Figure 10:
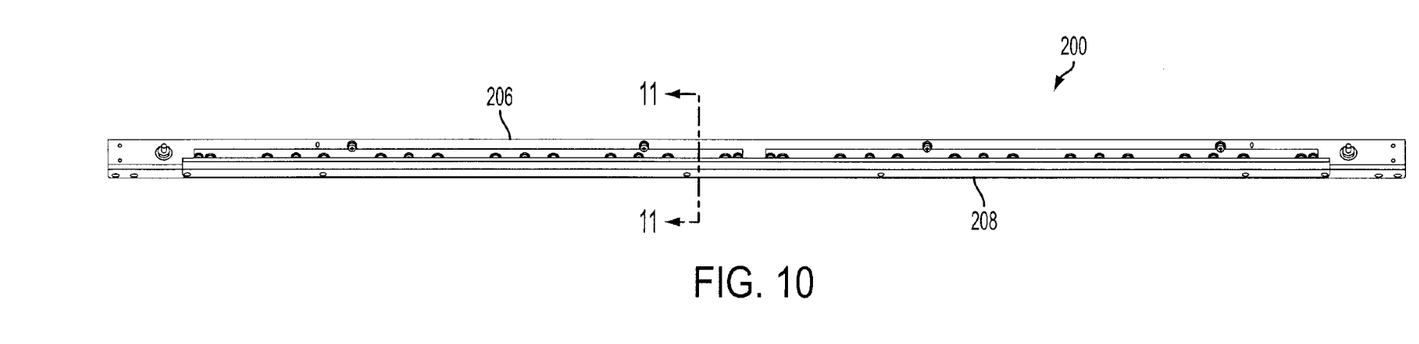
FIG. 10 depicts a front view of the ceiling luminaire depicted in FIG. 7.
Figure 11:
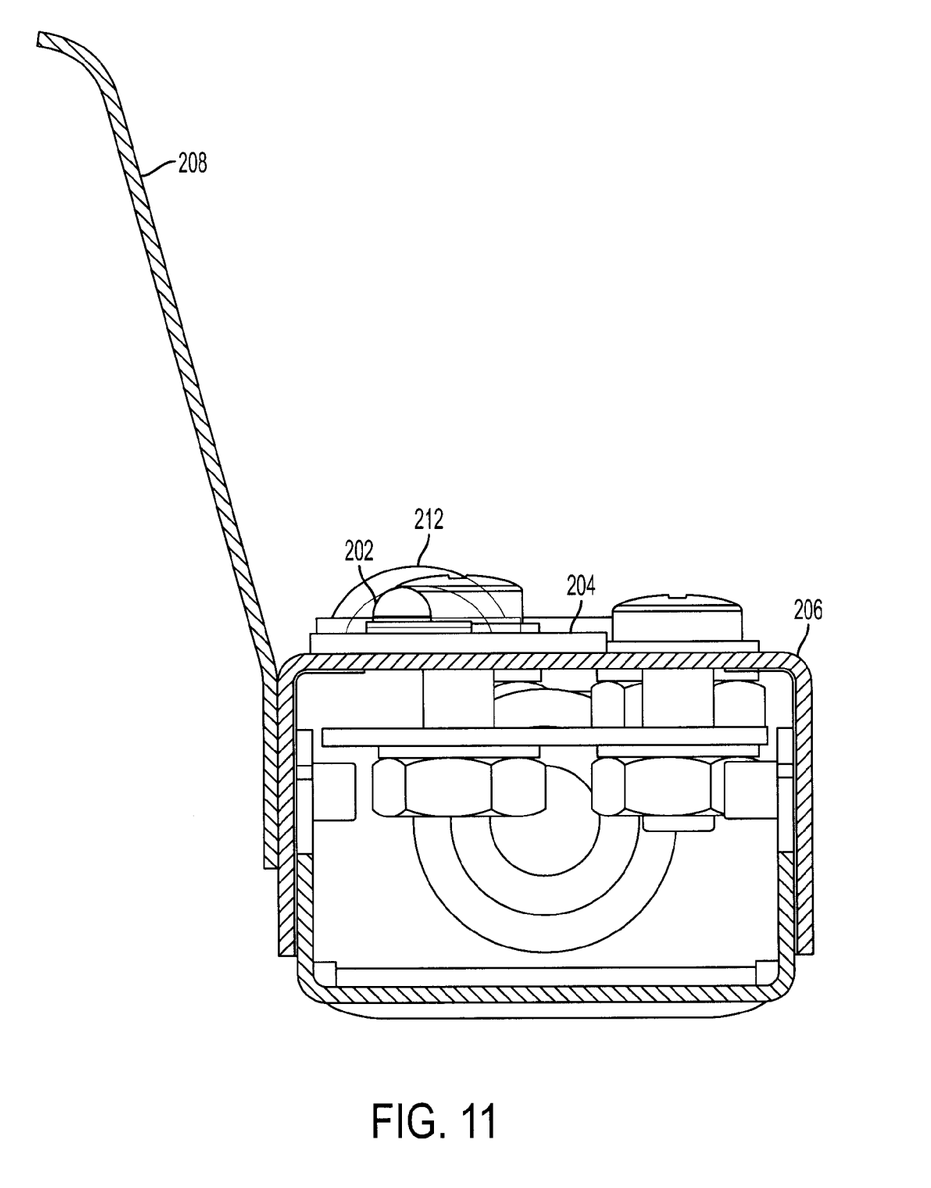
FIG. 11 depicts a sectional view of the ceiling luminaire depicted in FIG. 10.

In addition to maximizing light recovery from the LED emitters 102 and controlling the beam pattern of the projected light, the linear reflector 108 also serves to homogenize the light from the LED point sources so that a completely blended light pattern is projected onto the sidewall panel 110 at distances of less than 1 inch from the luminaire. This eliminates the "hot spotting" that would typically be experienced with linear LED luminaires employing widely spaced LED emitters.

Thermal efficiency is maximized by employing HB LED emitters which have a minimal junction to ambient thermal resistance. These LED emitters are either soldered or bonded to a PCB assembly 104 which is designed for efficient thermal transfer between the LED bonding surface and the back of the PC board. The PCB assembly is in turn, bonded to housing 106 of the luminaire 100. By employing HB LED emitters 102 in conjunction with suitable inter-LED spacing and a highly efficient heat transfer method, it is possible to limit the heat sink surface area requirement to the thermal PCB assembly 104 and the housing 106 of the luminaire 100 with no additional heat sink surface. This advantageously results in a light weight luminaire which still has high light output capacity.

Plug 114 and receptacle 116 may be used to join multiple luminaire 100 together, and provide power and/or control signals thereto.

Ceiling Luminaire Embodiment

In the embodiment depicted in FIGS. 7-12, ceiling luminaire 200 is similar in many respects to sidewall luminaire 100, with one exception being the angular relationship between the luminaire housing 206 and the reflector 208—this angle has been changed to create a wider projected beam angle. Ceiling luminaire 200 employs a linear array of HB LED emitters 202 which are directly bonded to a thermally conductive printed circuit board assembly 204, which is mounted on a surface of housing 206. The LED emitters 202 may be arranged with a center-to-center spacing between about 0.5 inches and 3 inches, or, preferably, between 1 and 2 inches. In one embodiment, the center-to-center spacing is 1.5 inches. An LED driver assembly is disposed within the housing 206, and provides power to the LED emitters.

Additionally, a protective lens cap 212 may be placed over each LED emitter 202 to protect the emitter from impact, since it is more exposed in this application. The protective lens cap 212 may be completely clear in order to minimize transmission losses. The lens cap 212 may be seamless and placed very close to the HB LED emitter lens 202. By moving the focal point of the protective lens 212 very close to the emitter, the focal plane of the projected image will be extremely far from the luminaire 200. This results in no unsightly aberrations being projected onto the ceiling panel 210.

Figure 12:
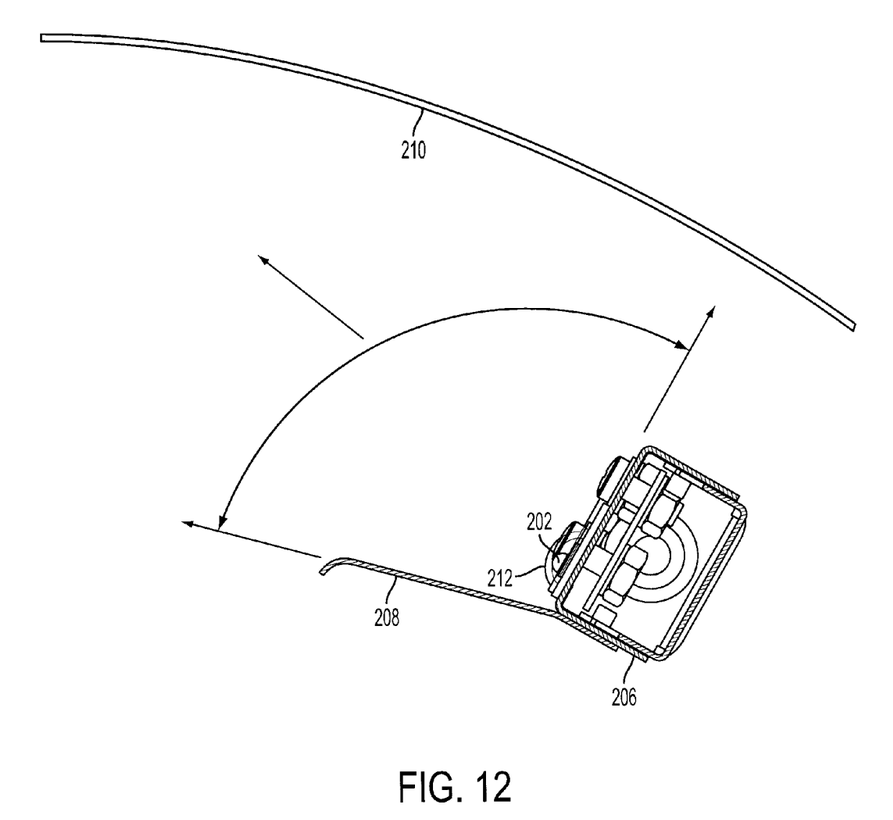
FIG. 12 depicts a ceiling installation geometry, in accordance with an embodiment of the present invention.

Once again, the reflector 208 is angled so that is approximately parallel to the plane of the panel 210. In the ceiling embodiment, the beam angle of the projected light pattern is typically greater than 90 degrees. Despite the fact that the angular relationship between the luminaire housing 206 and the reflector 208 has been increased however, the HB LED emitters 202 cannot be directly viewed by an observer because the observer's position is below the lip of the angled reflector 208 and in addition, the LED lens is kept close to the reflector 208. This relationship is illustrated in FIG. 12.

In the wide beam angle configuration employed for the ceiling luminaire 200, light power output is not equal in all directions from the luminaire. However, the angular relationship between the reflector 208 and the housing 206 has been tuned to maximize light projection in a direction which is roughly centered between the reflector 208 and housing 206. This is the direction where the projected light has the greatest distance to travel to the panel 210 and where the greatest light output level is therefore beneficial.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A light emitting diode (LED) luminaire, comprising:
a housing including an upper surface, a sidewall extending away from the upper surface, and an enclosed space defined at least in part by the upper surface and the sidewall;
a printed circuit board assembly thermally coupled to the upper surface of the housing external to the enclosed space;
a plurality of high brightness (HB) LED emitters thermally coupled to the printed circuit board assembly to form a linear array external to the enclosed space, wherein a protective lens cap is disposed over each HB LED emitter, the protective lens cap being seamless and positioned to have a focal point arranged such that a focal plane of projected image extends away from the luminaire; and
a linear reflector assembly, attached to the sidewall of the housing external to the enclosed space and extending away from the upper surface, to concentrate a light generated by the LED emitters over a beam angle formed by the upper surface of the housing and the linear reflector assembly, wherein the plurality of HB LED emitters are placed in parallel close to a conjunction of the linear reflector assembly and the upper surface of the housing to maximize recovery of the light generated by the LED emitters,
wherein the luminaire is configured to project a blended, uniform light pattern onto the sidewall or ceiling panel located at least one inch from the linear reflector assembly; and
wherein a surface of the linear reflector assembly is approximately parallel to the ceiling panel and the beam angle projected onto the ceiling panel is configured to be greater than 90°.

2. The LED luminaire of claim 1, wherein the HB LED emitters are evenly spaced within the linear array, with a center-to-center spacing of between 0.5 inch and 3 inches.

3. The LED luminaire of claim 2, wherein the center-to-center spacing is 1.5 inches.

4. The LED luminaire of claim 1, wherein the linear array includes at least two different colors of HB LED emitters.

5. The LED luminaire of claim 4, wherein the linear array includes alternating colors of HB LED emitters.

6. The LED luminaire of claim 1, wherein the HB LED emitters have a drive current capability in excess of 300 ma.

7. The LED luminaire of claim 1, wherein the HB LED emitters have a low profile and a Lambertian projection pattern.

8. The LED luminaire of claim 1, wherein the HB LED emitters are thermally bonded to the printed circuit board assembly.

9. The LED luminaire of claim 8, wherein the printed circuit board assembly is thermally bonded to the housing.

10. The LED luminaire of claim 1, wherein the enclosed space of the housing contains an LED driver assembly, coupled to the HB LED emitters, to provide power thereto.

11. The LED luminaire of claim 10, further comprising a connector plug and a connector socket, coupled to the LED driver assembly, to convey power and control signals.

12. The LED luminaire of claim 1, wherein the linear reflector comprises a first flat portion arranged above and over the linear array of the LED emitters.

13. The LED luminaire of claim 1, wherein the housing is configured with a substantially rectangular cross-section having an elongated length parallel to an axis of the linear array of the LED emitters.

14. The LED luminaire of claim 1, wherein the linear reflector comprises a first flat portion attached to the sidewall of the housing, the first flat portion being connected to a second flat portion extending above the upper surface.

15. The LED luminaire of claim 14, wherein the first flat portion is connected to the second flat portion through a bent portion.

16. The LED luminaire of claim 1, wherein the linear reflector comprises a first flat portion arranged above and over the linear array of the LED emitters; and
wherein the first flat portion is connected to a second flat portion through a bent portion.

17. A light emitting diode (LED) luminaire, comprising:
a housing including an upper surface, a sidewall extending away from the upper surface, and an enclosed space defined at least in part by the upper surface and the sidewall;
a printed circuit board assembly thermally coupled to the upper surface of the housing external to the enclosed space;
a plurality of high brightness (HB) LED emitters thermally coupled to the printed circuit board assembly to form a linear array external to the enclosed space; and
a linear reflector assembly, attached to the sidewall of the housing external to the enclosed space and extending away from the upper surface, to concentrate a light generated by the LED emitters over a beam angle formed by the upper surface of the housing and the linear reflector assembly, wherein the plurality of HB LED emitters are placed in parallel close to a conjunction of the linear reflector assembly and the upper surface of the housing to maximize recovery of the light generated by the LED emitters, wherein the housing is configured with a substantially rectangular cross-section having an elongated length parallel to an axis of the linear array of the LED emitters;

wherein the linear reflector comprises a first flat portion attached to the sidewall of the housing, the first flat portion being connected to a second flat portion extending above the upper surface;

wherein the luminaire is configured to project a blended, uniform light pattern onto the sidewall or ceiling panel located at least one inch from the linear reflector assembly; and wherein a surface of the linear reflector assembly is approximately parallel to the ceiling panel and the beam angle projected onto the ceiling panel is configured to be greater than 90°.

* * * * *